(12) United States Patent
Korolev et al.

(10) Patent No.: US 9,264,787 B2
(45) Date of Patent: Feb. 16, 2016

(54) COMMUNICATION SYSTEM FOR PROCESS FIELD DEVICE

(75) Inventors: Eugene Korolev, Maple Grove, MN (US); John P. Schulte, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 190 days.

(21) Appl. No.: 12/955,185

(22) Filed: Nov. 29, 2010

(65) Prior Publication Data
US 2012/0136931 A1     May 31, 2012

(51) Int. Cl.
H04Q 9/00        (2006.01)
H04L 25/03       (2006.01)
H04B 3/32        (2006.01)
H04B 1/7107      (2011.01)
H04B 15/02       (2006.01)

(52) U.S. Cl.
CPC .............. *H04Q 9/00* (2013.01); *H04L 25/0328* (2013.01); *H04B 1/7107* (2013.01); *H04B 3/32* (2013.01); *H04B 15/02* (2013.01); *H04Q 2209/10* (2013.01); *H04Q 2209/40* (2013.01)

(58) Field of Classification Search
USPC ........................... 709/204, 223; 370/278, 310
See application file for complete search history.

(56) References Cited

U.S. PATENT DOCUMENTS

| 6,745,018 | B1* | 6/2004 | Zehavi et al. | 455/296 |
| 7,336,068 | B2 | 2/2008 | Muller | |
| 7,676,580 | B2 | 3/2010 | Hill et al. | |
| 2003/0041135 | A1* | 2/2003 | Keyes et al. | 709/223 |
| 2004/0205781 | A1 | 10/2004 | Hill et al. | |
| 2004/0251915 | A1* | 12/2004 | Hagerling et al. | 324/614 |
| 2005/0265269 | A1 | 12/2005 | Saito et al. | |
| 2006/0098986 | A1* | 5/2006 | Jung et al. | 398/140 |
| 2007/0064923 | A1 | 3/2007 | Schmukler et al. | |
| 2008/0159453 | A1* | 7/2008 | Smith | 375/350 |
| 2008/0191807 | A1 | 8/2008 | Mun et al. | |
| 2009/0077279 | A1* | 3/2009 | Golbus et al. | 710/61 |
| 2009/0311971 | A1* | 12/2009 | Kielb et al. | 455/74.1 |
| 2012/0136931 | A1 | 5/2012 | Korolev et al. | |

FOREIGN PATENT DOCUMENTS

| CN | 1704918 A | 12/2005 |
| CN | 101556785 A | 10/2009 |
| CN | 202331127 U | 7/2012 |

(Continued)

OTHER PUBLICATIONS

International Search Report and Written Opinion for PCT Application No. PCT/US2011/061136, dated Feb. 29, 2012, 11 pages.
1st Office Action dated Dec. 3, 2013 in related Chinese Patent Application No. 201110286820.8, 13 pgs. including English Translation.
Office Action from Canadian Patent Application No. 2,818,159, dated Aug. 21, 2014.

(Continued)

*Primary Examiner* — Yemane Mesfin
*Assistant Examiner* — Peter Chen
(74) *Attorney, Agent, or Firm* — Westman, Champlin & Koehler, P.A.

(57) ABSTRACT

A field device for use in an industrial process, includes a process interface element configured to measure or control a process variable. Communication circuitry is configured to communicate with another location. A communication system is configured to provide communications between at least two components in the field device. A signal inverter couples an inverted signal from the communication system to other circuitry to thereby reduce interference received by the other circuitry.

14 Claims, 5 Drawing Sheets

(56) References Cited

FOREIGN PATENT DOCUMENTS

| | | |
|---|---|---|
| JP | 2005-339424 | 12/2005 |
| JP | 2007-502054 | 2/2007 |
| JP | 2008-199611 | 8/2008 |
| RU | 2271517 | 3/2006 |
| RU | 2278357 | 6/2006 |
| RU | 2363040 | 7/2009 |
| RU | 2363974 | 8/2009 |
| WO | 97/31431 A1 | 8/1997 |
| WO | 02/074008 A2 | 9/2002 |
| WO | WO 02/097551 | 12/2002 |
| WO | WO 2005018134 | 2/2005 |
| WO | WO 2005/086110 | 9/2005 |

OTHER PUBLICATIONS

Office Action from Chinese Patent Application No. 201110286820.8, dated Jul. 22, 2014.
Office Action from Japanese Patent Application No. 2013-540974 dated Jun. 27, 2014.
Office Action from Chinese Patent Application No. 201110286820.8, dated Feb. 3, 2015.
Office Action from Japanese Patent Application No. 2013-540974, dated Mar. 18, 2015.
Office Action from Russian Patent Application No. 2013129543, dated Jan. 30, 2015.
Office Action from Canadian Patent Application No. 2,818,159, dated Jul. 30, 2015.

* cited by examiner

COMMUNICATION SYSTEM FOR PROCESS FIELD DEVICE

BACKGROUND OF THE INVENTION

The present invention relates to field devices of the type used to monitor or control industrial processes. More specifically, the present invention relates to internal data communications in such field devices.

Industrial processes are used to perform various functions in a process or create goods from other components. Such processes include, for example, oil refineries, manufacturing plants, food processing plants, chemical plants and pharmaceutical plants. In such systems, field devices are used to monitor or control operation of the process. One such device is a process transmitter which is configured to sense a process variable and communicate to a centralized location based upon the sensed process variable. Example process variables include flow, pressure, temperature, level, etc. A process controller is an example of another field device in which a control signal received from the centralized location and the process controller responsively controls a process variable. The communication with the centralization location may be over a wired or a wireless process control loop.

Process devices frequently operate under power restrictions. Further, such devices typically have multiple components and use communication systems to communicate between these components. In some instances, such as when operating using limited power, one communication system can cause interference with data transmitted on another communication system. This "noise" can introduce errors in the device and even cause a failure of the device.

SUMMARY

A field device for use in an industrial process, includes a process interface element configured to measure or control a process variable. Communication circuitry is configured to communicate with another location. A communication system is configured to provide communications between at least two components in the field device. A signal inverter is couples an inverted signal from the communication system to other circuitry to thereby reduce interference received by the other circuitry.

DETAILED DESCRIPTION

The present invention relates to field devices used in industrial process control and monitoring systems. As discussed in the Background section, communications in such field devices can introduce noise in other circuitry, such as another communication system.

Figure 1:
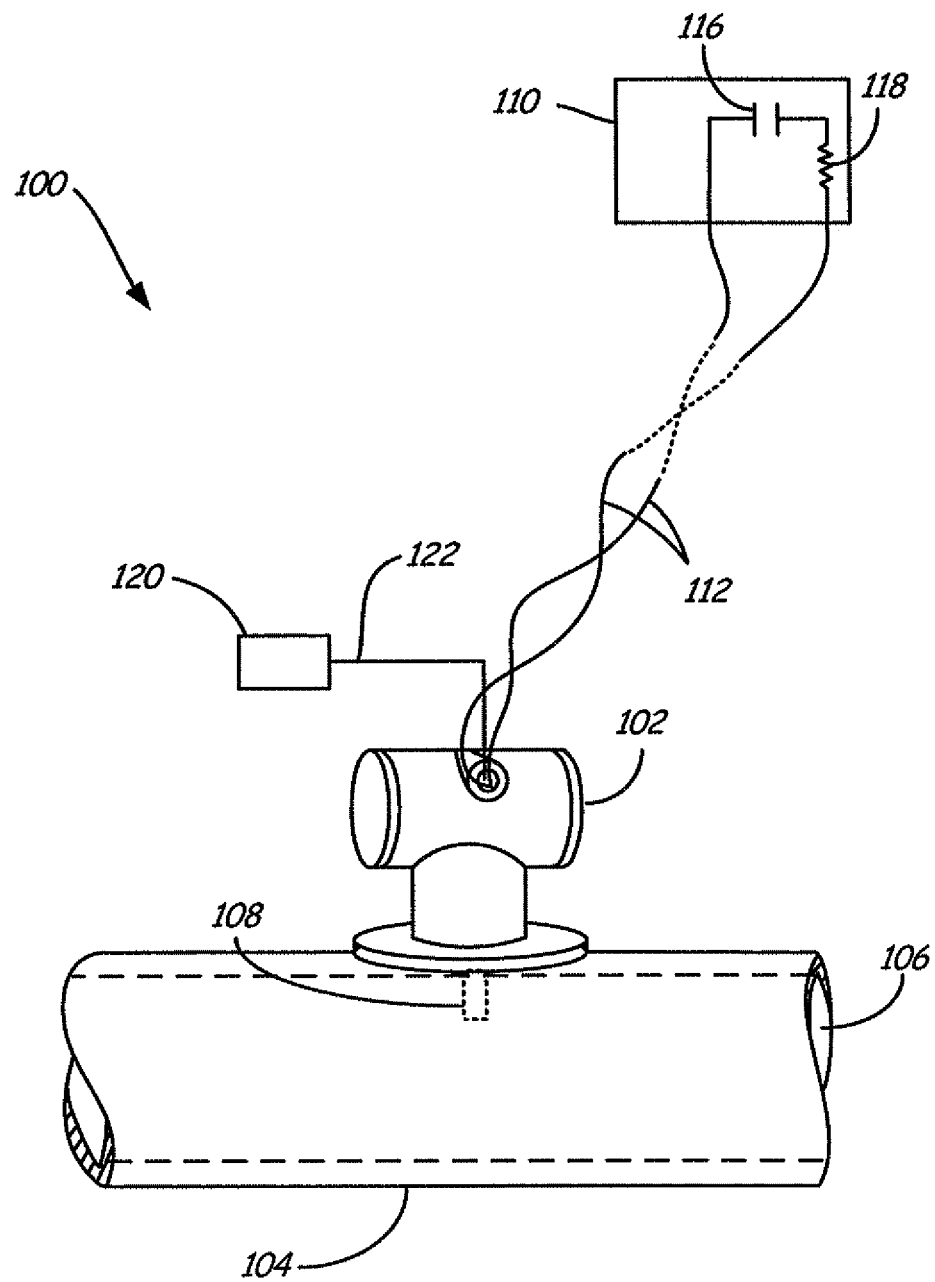
FIG. 1 is a simplified block diagram of an industrial process control or monitoring system.

FIG. 1 is a simplified block diagram of an industrial control or monitoring system 100 including a field device 102 coupled to the industrial process. In the example of FIG. 1, the field device 102 couples to process piping 104 carrying a process fluid 106. A process interface element 108 is provided which can be configured to control the process (for example a valve or the like) if field device 102 is operating as a controller, or can be configured to measure a process variable (such as temperature, pressure, flow, etc.) if a field device 102 is configured as a process variable transmitter. Field device 102 may also operate as other types of field devices such as a stand alone field device or a field device which includes both control and measurement components, etc. In FIG. 1, field device 102 couples to a central control room 110 through a process control loop 112. In the embodiment illustrated in FIG. 1, the process control loop 112 is a two-wire process control loop. Such process control loops frequently operate in accordance with communication standards such as the HART® digital communication standard, a field bus protocol etc. For example, a two-wire process control loop can be used to power the field device 102 as well as carry information between the field device 102 and the central location 110. Information can be carried in an analog manner, for example as a current level which varies between 4 mA and 20 mA, and/or can be a digital signal which is modulated onto the current flowing through the loop 112. In another example configuration, the process control loop 112 is in accordance with wireless communication protocols which may include, for example, a mesh network type protocol and may operate in accordance with the HART® wireless communication protocol. Central location 110 is illustrated as including a load resistance 118 and a voltage source 116. Typically, other components, such as control equipment or monitoring equipment, are used in the central location 110 and may be monitored by an operator.

FIG. 1 also illustrates a secondary component 120 coupled to the field device 102 through a local databus 122. The secondary component 120 may be positioned internally or externally to the field device 102. The databus may operate in accordance with any appropriate technique. One example is a CAN (Control Area Network) based protocol or other commercially available or proprietary protocols.

Figure 2:
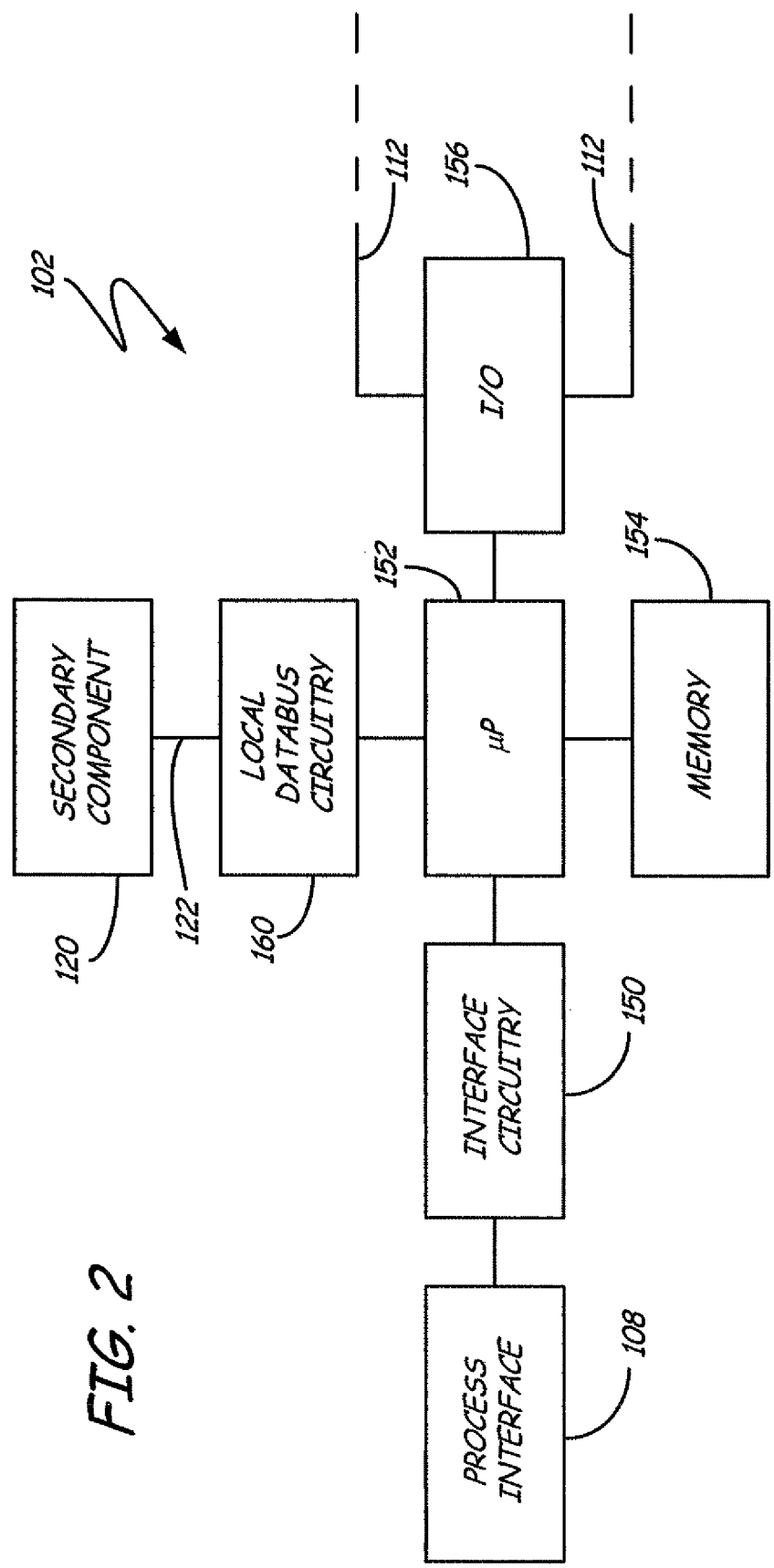
FIG. 2 is a simplified block diagram showing a field device from FIG. 1.

FIG. 2 is a simplified block diagram showing field device 102 in greater detail. Field device 102 includes interface circuitry 150 configured to operate with the process interface element 108. Interface circuitry 150 couples to a microprocessor 152 which operates in accordance with instructions stored in a memory 154. Loop input/output communication circuitry 156 is provided for allowing communication on the process control loop 112. As illustrated in FIG. 2, the field device 102 also includes local databus communication circuitry 160 for use in providing communications between microprocessor 152 and secondary component 120 over local databus 122. The secondary component 120 can comprise any component to which data is communicated on a databus 122 and may be positioned within the field device 102, near the field device 102, or even remotely from the field device 102. Examples of a secondary component include sensors, control elements, displays or other user interface, another field device, additional processing circuitry, etc. Circuitry 156 and 160 are examples of communication systems as discussed herein.

Figure 3:
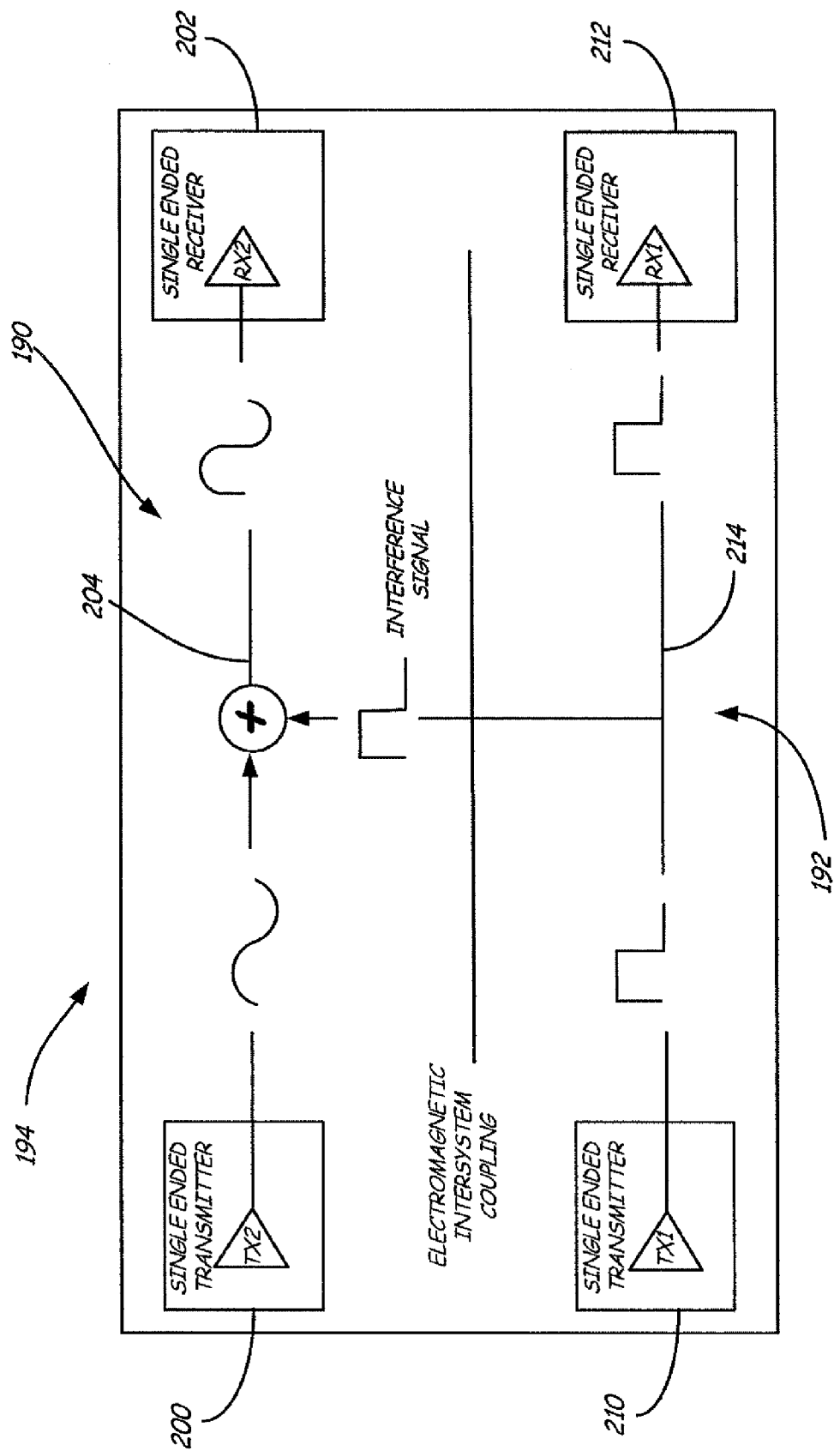
FIG. 3 is a diagram illustrating noise from a first databus being injected into a second databus.

FIG. 3 is a simplified block diagram illustrating interference between two communication systems 190, 192 in a field device 194. In FIG. 3, a first single ended transmitter 210 communicates with a first single ended receiver 212 through a first databus 214. Similarly, a second single ended transmitter 200 communicates with a second single ended receiver 202 through a second databus 204. As illustrated in FIG. 3, an interference signal from databus 214 is added to the data signal carried on databus 204 resulting in a distortion to the waveform of the data signal on databus 204. This interference signal may add or subtract from the data signal depending on the phase of the interference. At the low voltage levels frequently present in field devices, the interference signal may cause erroneous data to be received by receiver 202.

One technique which can be used to address this interference and enhance the noise immunity of the system is by using a differential signaling system such as are commercially available in accordance with the RS-485 and RS-422 communication protocols. In such a system, a differential transmitter provides a signal with equal and opposite polarities on a differential transmission line. The differential transmission line consists of two conductors which are configured as a balanced pair and therefore each conductor has equal impedance along its length, and equal impedance to ground and other circuitry. Proper implementation of this configuration requires the circuitry to comply with network physical layer rules which may entail requirements for timing, voltage level and impedance characteristics. However, such a configuration increase the complexity of the device and also increase manufacturing costs and time required to design and manufacture such a device.

Figure 4:
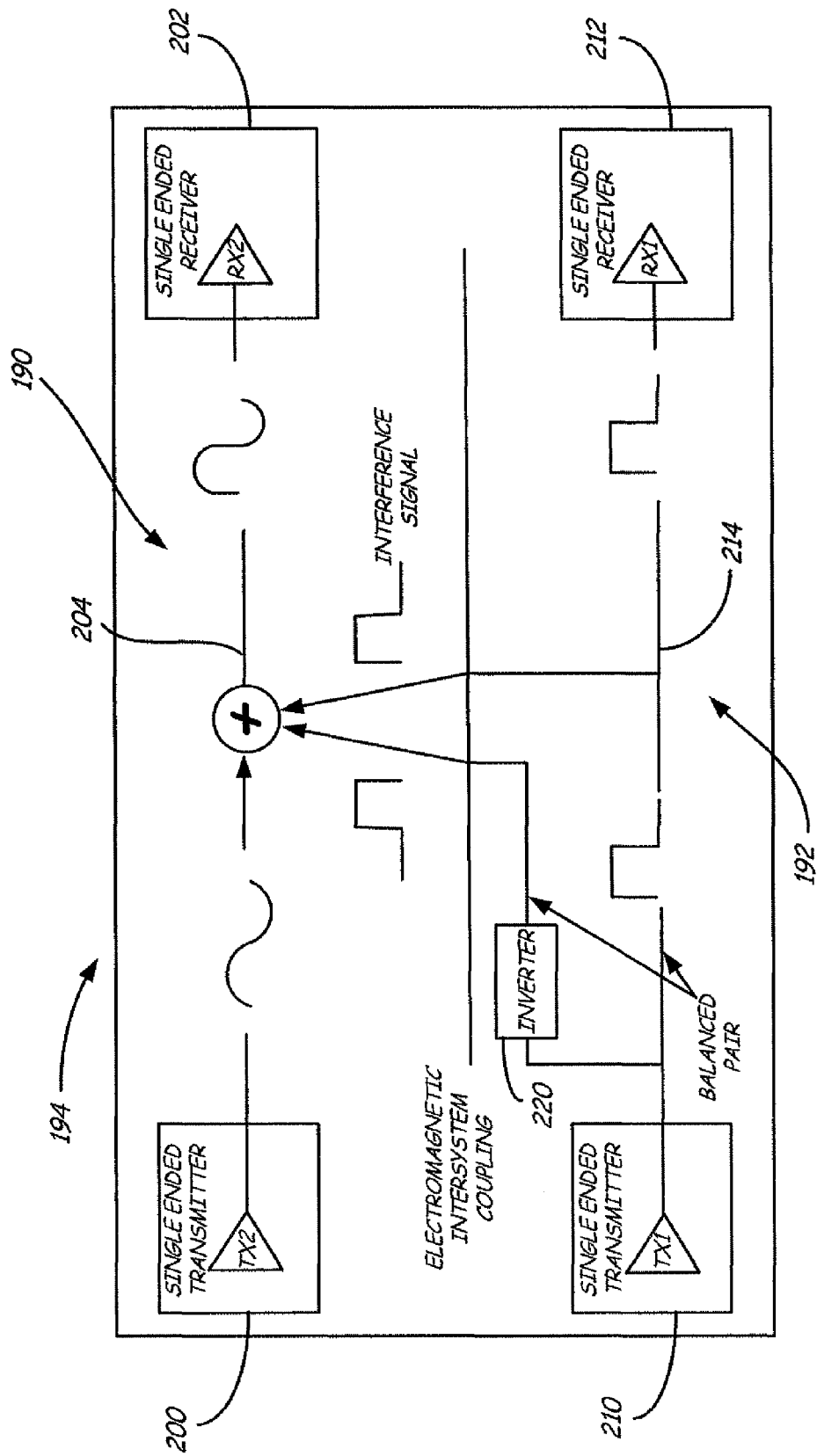
FIG. 4 is a diagram illustrating the use of an inverter to reduce or eliminate the noise shown in connection with FIG. 3.

FIG. 4 is a simplified block diagram illustrating one example embodiment of the present invention which addresses the above mentioned interference problems. In the configuration of FIG. 4, items which are similar to those shown in FIG. 3 have retained their numbering. In FIG. 4, an inverting amplifier (inverter) 220 is coupled to the output of single ended transmitter 210. The inverting amplifier 220 is used to invert the signal on databus 214 and inject the inverted signal into the databus 204. The inverter 220 is configured such that the amplitude, phase and wave shape of the injected signal are similar to an inversion of the stray interference signal from databus 214 which is coupled into databus 204. The more closely these two signals are inversions of one another, the greater the cancellation effect will be of the inverted signal from the inverter 220. As the output from the inverter 220 is not used for communication, the output signal does need to conform to the requirements of a communication system. The output from inverter 220 need only comply with any requirements necessary for the desired level of noise cancellation. Therefore, the inverter circuit 220 can be of a relatively simple design compared to a full differential amplifier configuration. Furthermore, as the configuration illustrated in FIG. 4 operates using single ended transmitters and receivers, the system does not require the more complex differential drivers and receivers described above.

Figure 5:
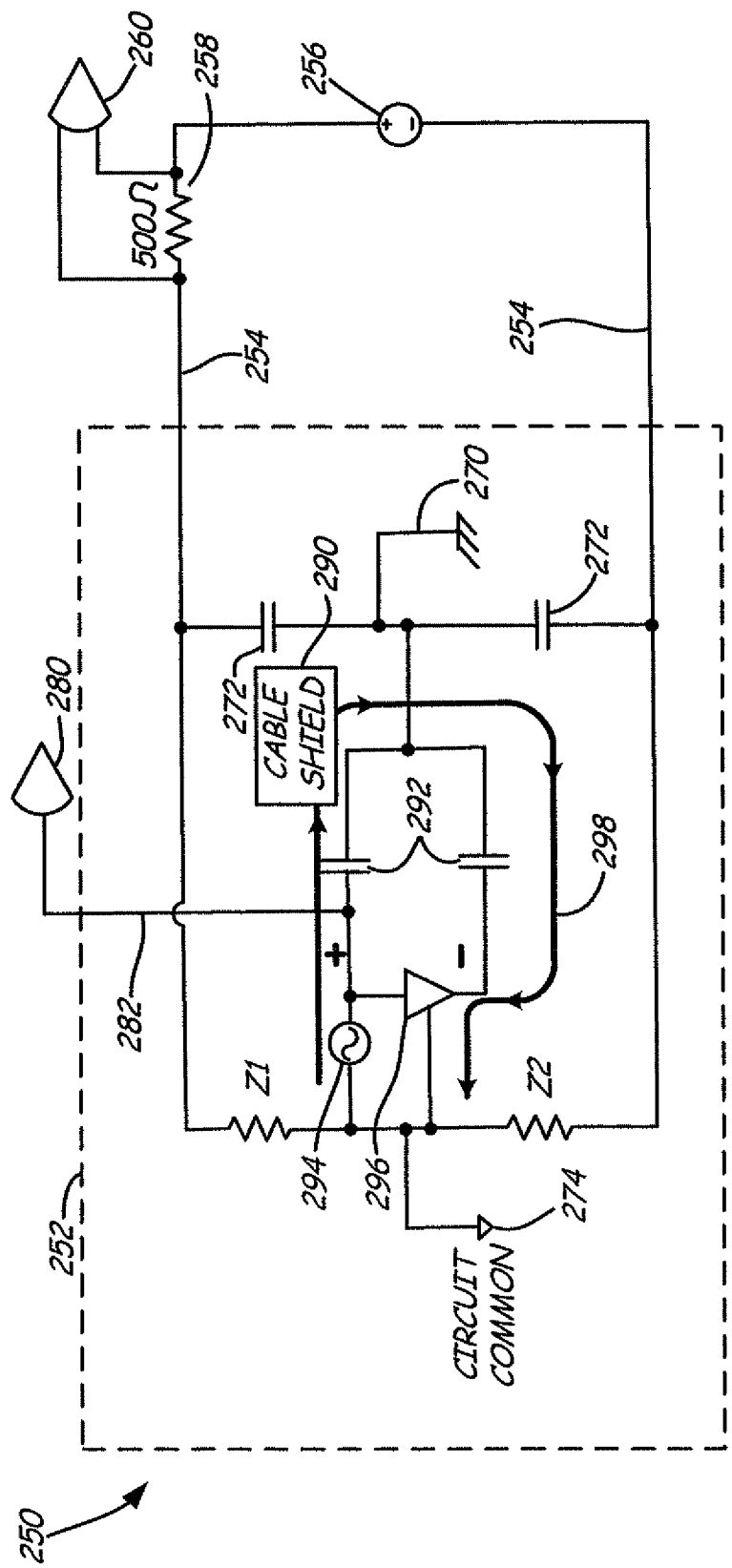
FIG. 5 is a simplified block diagram showing an example embodiment of the present invention.

FIG. 5 is a simplified block diagram of an industrial process control or monitoring system 250 including a field device 252 coupled to a two wire process control loop 254. Loop 254 connects to loop power supply 256 and a load (or sense) resistor 258. Data carried on the two wire loop 254 can be sensed using a loop receiver 260 coupled across the load resistor 258.

In FIG. 5, the field device 252 is illustrated as having a housing which provides an electrical ground 270 which is capacitively coupled to the two wire process control loop 254 through capacitors 272. The field device 252 includes circuit common 274 which couples to the process control loop 254 to impedance Z1 and Z2. The circuitry is configured to communicate with a remote receiver 280 over a databus 282. This databus can be, in accordance with the CAN protocol. The physical connection for databus 282 can comprise a center conductor and a cable shield 290. This cable shield is connected to housing ground 270 and is capacitively coupled to the center connector (also illustrated at element 282) through cable capacitance 292. Data is transmitted to the remote receiver 280 using signal source 294. As discussed above, the signal from 294 can introduce an interference signal onto the two wire process control loop 254 which appears across load resistor 258. However, in accordance with the present invention, an inverting amplifier 296 is provided and is arranged to couple an inverted signal from the databus 282 onto the process control loop 254. As illustrated in FIG. 5, an interference signal 298 from the signal source 294 is cancelled or otherwise reduced in magnitude by the output from the inverting amplifier 296. In the configuration of FIG. 5, the connection between the field device 252 and the remote receiver 280 provides one databus while the connection between the field device 252 and the loop receiver 260 through the two wire process control loop 254 provides another databus.

Although the present invention has been described with reference to preferred embodiments, workers skilled in the art will recognize that changes may be made in form and detail without departing from the spirit and scope of the invention. Although the field device illustrated herein includes only two local databuses, the invention is operable with any number of databuses and is not limited to the particular configurations set forth herein. The inverter can be in accordance with any appropriate inverter design and may comprise, for example, a simple inverting amplifier. In one example configuration, one of the databuses comprises the two-wire or wireless process control loop which is used to couple the field device with, for example, a central control room or the like. In such a configuration, the local databus may cause noise to be injected into the two-wire or wireless process control loop. Similarly data carried on the two-wire or wireless process control loop may cause noise to be injected on to the local databus. Alternatively, the single ended transmitter 200 illustrated in FIG. 4 operates as the input/output circuitry 156 shown in FIG. 2. Although FIG. 4 illustrates a single inverter 220 which couples an inverted signal from one databus to the other databus, in another example configuration a second inverter is implemented which couples an inverter signal in an opposite direction between the two databuses. In some configurations, one or more of the databuses can a comprise wireless databus.

What is claimed is:

1. A field device for use in controlling or monitoring a process variable of an industrial process, comprising:
   a process interface element configured to measure or control the process variable of the industrial process;
   a first communication system including a single ended transmitter and receiver;
   a second communication system configured to provide communications between at least two second components, the second communication system comprising a signal source that produces a signal that couples to the first communication system through electromagnetic intersystem coupling to form an interference signal in the first communication system;
   a signal inverter coupled to the output of the signal source and configured to receive and invert the signal produced by the signal source to produce an inverted signal that is the inverse of the signal produced by the signal source and couples to the first communication system through electromagnetic intersystem coupling to produce an injected signal in the first communication system to thereby reduce interference from the second communication system to the first communication system, wherein the injected signal has a phase, amplitude and wave shape which are an inversion of the interference signal; and wherein the field device is configured to communicate with another location in the industrial process;

wherein the first and second communication systems communicate digital information and the first communication system comprises loop input/output circuitry used to communicate with a remote location over a process control loop and the second communication system comprises local databus communication circuitry used to communicate locally.

2. The field device of claim 1 wherein the first communication system is configured to communicate with the another location in the industrial process.

3. The field device of claim 1 wherein the second communication system includes a local databus.

4. The field device of claim 1 wherein the process interface element comprises a process variable sensor.

5. The field device of claim 1 wherein the process interface element comprises a control element.

6. The field device of claim 1 wherein at least one of the first and second communication systems includes a wireless databus.

7. The field device of claim 1 wherein at least one of the first and second communication systems comprises a single ended communication system.

8. The field device of claim 1 including a second signal inverter configured to invert a signal carried on the first communication system to form an inverted signal that is coupled to the second communication system by electromagnetic intersystem coupling to thereby reduce interference from the first communication system to the second communication system.

9. A method for use in a field device of the type used to control or monitor a process variable in an industrial process, the method for providing communications between components:

interfacing with the industrial process through a process interface configured to measure or control the process variable of the industrial process;

communicating data between at least two first components over a first databus between a single ended transmitter and a single ended receiver;

communicating data between at least two second components over a second databus, wherein at least one of the two second components is located in the field device;

obtaining a communication signal sent between the at least two components on the second databus;

inverting the communication signal to form an inverted signal that is an inversion of the communication signal; and injecting the inverted signal onto the first databus through electromagnetic intersystem coupling to thereby reduce an interference signal formed on the first databus through electromagnetic intersystem coupling of the communication signal, wherein the injected signal introduced on the first databus through electromagnetic intersystem coupling has a phase, amplitude and wave shape which are an inversion of the interference signal;

wherein the field device is configured to communicate with another location in the industrial process;

wherein the first and second databuses communicate digital information and the first databus couples to loop input/output circuitry used to communicate with a remote location over a process control loop and the second databus couples to local databus communication circuitry used to communicate locally.

10. The method of claim 9 wherein the first databus is configured to communicate with the another location in the industrial process.

11. The method of claim 9 wherein the second databus includes a local databus.

12. The method of claim 9 wherein at least one of the first and second databuses includes a wireless databus.

13. The method of claim 9 wherein at least one of the first and second databuses comprises a single ended databus.

14. The method of claim 9 including providing a second inverted signal from the first databus to the second databus to thereby reduce interference.

* * * * *